2,963,474
Patented Dec. 6, 1960

2,963,474

ORGANIC COMPOUNDS

Philip E. Wiegert, St. Louis, and Robert D. Rands, Jr., Greendale, Mo., assignors to Mallinckrodt Chemical Works, St. Louis, Mo., a corporation of Missouri No Drawing. Filed July 23, 1958, Ser. No. 750,307

8 Claims. (Cl. 260—211)

This invention relates to organic compounds and more particularly to certain novel benzoic acid derivatives.

Briefly the present invention is directed to certain novel compounds of the formula:

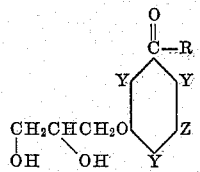

where Y is hydrogen or iodine; Z is —$NO_2$ or —NHX, where X is hydrogen or a lower acyl radical; and R is —$NH_2$ or —OR', where R' is hydrogen, a lower alkyl radical, or a pharmaceutically acceptable cation, and to methods for preparing them.

Among the objects of the present invention may be noted the provision of new benzoic acid derivatives; the provision of new halogenated compounds; the provision of novel compounds which are useful intermediates for the preparation of new benzoic acid derivatives; the provision of compounds of the type indicated which are useful for the preparation of roentgenographic contrast media; and the provision of methods of preparing these compounds. Other objects and features will be in part apparent and in part pointed out hereinafter.

The invention accordingly comprises the products and methods hereinafter described, the scope of the invention being indicated in the following claims.

The present invention is directed to the novel benzoic acid derivatives represented by the formula:

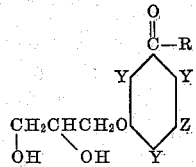

where Y is hydrogen or iodine; Z is —$NO_2$ or —NHX, where X is hydrogen or a lower acyl radical; and R is —$NH_2$ or —OR', where R' is hydrogen, a lower alkyl radical, or a pharmaceutically acceptable cation.

In the preparation of the novel compounds of the invention it is convenient to use commercially available 3,5-dinitrobenzoic acid as the starting material. This compound is conveniently converted to 3-hydroxy-5-nitrobenzoic acid by known processes, such as reduction of one nitro group with a selective reducing agent, such as sodium hydrosulfide or ammonium sulfide, and diazotization of the resulting amine followed by hydrolysis of the diazo compound.

In the preparation of the novel iodinated acids, salts and esters of the invention, the carboxyl group of the 3-hydroxy-5-nitrobenzoic acid is advantageously esterified to forestall its reacting with the glycerol derivative used in the subsequent etherification step. The ether is then conveniently prepared by causing a solution of a salt, formed by neutralizing the phenolic hydroxyl group, of the esterified 3-hydroxy-5-nitrobenzoic acid to react with an appropriate glycerol derivative, such as glycerol monohalohydrin. Although this step may be carried out in either an alcoholic or aqueous medium, the former is preferred, since in the presence of water there is some hydrolysis of the ester. Moreover, it is more difficult to recover the product from an aqueous medium in high yield because of the solubility of the product in water. The free carboxyl group may then be regenerated by hydrolysis of the ester, and the nitro group may then be conveniently reduced by an appropriate process, such as catalytic hydrogenation, to form the corresponding amino compound. Iodine may then be conveniently introduced by means of an iodinating agent such as iodine monochloride and the resulting triiodo compound may then conveniently be acylated by means of an acid anhydride or other appropriate acylating agent such as an acyl halide, to yield the corresponding 3-alkanamido-5-dihydroxypropoxy-2,4,6-triiodobenzoic acid. Salts and esters thereof may be prepared by means well known to those skilled in the art.

In the preparation of the novel iodinated benzamides of the invention the benzamide grouping is preferably formed rather early in the synthesis. For example, the ester of 3-hydroxy-5-nitrobenzoic acid may conveniently be treated with ammonia to form 3-hydroxy-5-nitrobenzamide, after which the formation of the dihydroxypropoxy ether, reduction of the nitro group, iodination and acylation may be carried out by processes generally similar to those outlined above.

Although the various synthetic steps are preferably carried out in the order outlined above, it will be obvious to those skilled in the art that variations may be used, although these may reduce the yield or otherwise adversely affect the overall efficiency of the process.

The 3-alkanamido-5-(dihydroxypropoxy)-2,4,6-triiodobenzoic acids of the present invention are useful for the preparation of roentgenographic contrast media. For example, certain salts of these acids with non-toxic cations such as sodium and N-methylglucamine, are highly soluble in water, and sterile aqueous solutions of such salts are of low toxicity and contain a high concentration of organically bound and substantially physiologically inert iodine which can be administered intravenously. These iodinated compounds are excreted by the kidneys. Solutions of these acids or their salts in pharmaceutically acceptable solvents other than water are also useful for special purposes.

Dispersions of water insoluble derivatives of the acids, such as their esters and amides for example, are also useful, as for example in visualizing hollow structures and cavities having external orifices through which the contrast preparation can be introduced in preparation for the examination and removed after the examination is completed.

The compounds are also useful for the preparation of other types of contrast media, such as non-aqueous dispersions, for example.

As is evident from the preceding description of the synthetic processes used in preparing the novel 3-alkanamido-5-(dihydroxypropoxy)-2,4,6-triiodobenzoic acids and their amides, the intermediate compounds, both iodinated and uniodinated, are valuable for the preparation of these 3-alkanamido-5-(dihydroxypropoxy)-2,4,6-triiodobenzoic acids and other useful compounds.

The following examples illustrate the invention.

EXAMPLE 1

*Methyl 3-(2,3-dihydroxypropoxy)-5-nitrobenzoate*

Sodium metal (2.3 g., 0.1 g. atom) was dissolved in methanol (200 ml.) Methyl 3-hydroxy-5-nitrobenzoate (19.7 g., 0.1 mole) was dissolved in this solution, followed by a solution of glycerol alpha-monochlorohydrin (11.1 g., 0.1 mole) in methanol (20 ml.). The solution was stirred and heated under reflux on a steam bath for two hours, after which additional glycerol alpha-monochlorohydrin (2.0 g.) was added. The refluxing was then continued for a total of 24 hours to complete the formation of the methyl 3-(2,3-dihydroxypropoxy)-5-nitrobenzoate.

EXAMPLE 2

*Sodium 3-(2,3-dihydroxypropoxy)-5-nitrobenzoate*

A solution of sodium carbonate (30 g. $Na_2CO_3$ in 150 ml. of water) was added to the alkaline reaction mixture containing methyl 3-(2,3-dihydroxypropoxy)-5-nitrobenzoate from Example 1. The ester was hydrolyzed by refluxing the system for three hours, then the methanol was evaporated, leaving a residue of sodium 3-(2,3-dihydroxypropoxy)-5-nitrobenzoate, mixed with by-product sodium chloride.

EXAMPLE 3

*3-(2,3-dihydroxypropoxy)-5-nitrobenzoic acid*

The residue of sodium 3-(2,3-dihydroxypropoxy)-5-nitrobenzoate and sodium chloride from Example 2 was dissolved in water (300 ml.), the pH was adjusted to approximately 7 with dilute hydrochloric acid and the solution was treated twice with charcoal. It was then acidified, whereupon the product separated as an oil. The aqueous phase was decanted and fresh water was added, whereupon the crude 3-(2,3-dihydroxypropoxy)-5-nitrobenzoic acid crystallized. Yield, 12.0 g., N.E., 262 (theory, 257), M.P. 115–120° C.

EXAMPLE 4

*3-amino-5-(2,3-dihydroxypropoxy)-benzoic acid*

A solution of crude 3-(2,3-dihydroxypropoxy)-5-nitrobenzoic acid, prepared as described in Example 3 (12.0 g., 0.047 mole), in denatured alcohol (SD Formula 13 A, 150 ml.) was hydrogenated in the presence of a catalyst (5% palladium on charcoal, 2.0 g.). The theoretical quantity of hydrogen was absorbed in ten minutes. The catalyst was filtered off and the ethanol was evaporated under reduced pressure, leaving a viscous, resin-like residue of crude 3-amino-5-(2,3-dihydroxypropoxy)-benzoic acid.

EXAMPLE 5

*3-amino-5-(2,3-dihydroxypropoxy)-2,4,6-triiodobenzoic acid*

Iodine monochloride (25 g., 0.145 mole of 95% ICl in 25 ml. of concentrated hydrochloric acid) was added to a solution of crude 3-amino-5-(2,3-dihydroxypropoxy)-benzoic acid (0.047 mole), prepared as described in Example 4, in dilute hydrochloric acid (15 ml. of concentrated acid in 500 ml. of water). The solution was stirred at room temperature for a half hour and then on a steam bath for an additional hour. The tar which separated formed a hard ball on cooling. This was ground with a mortar and pestle and returned to the reaction mixture. Additional iodine monochloride (20 g. of 95% ICl) was added and the mixture was heated on a steam bath for an additional 6½ hours. The slurry stood overnight, after which the excess iodine monochloride was reduced by the addition of sodium bisulfite, and the crude 3-amino-5-(2,3-dihydroxypropoxy)-2,4,6-triiodobenzoic acid was filtered off. Yield, 18.0 g.; N.E., 593 (theory, 605); M.P. 197–199° C. (dec.).

EXAMPLE 6

*3-acetamido-5-(2,3-dihydroxypropoxy)-2,4,6-triiodobenzoic acid*

A mixture of acetic anhydride (35 ml.), crude 3-amino-5-(2,3-dihydroxypropoxy)-2,4,6-triiodobenzoic acid (18 g., 0.030 mole) and 5 drops of concentrated sulfuric acid was heated on a steam bath for one-half hour, after which the resulting solution was poured into a larger volume of water. The system was made alkaline with sodium hydroxide, the pH was adjusted to approximately 6, and the solution was treated twice with charcoal. Concentrated hydrochloric acid was added, crystallization was initiated and the mixture was refrigerated overnight to complete the crystallization. The crude product was filtered off and extracted with hot acetone, yielding 10 grams of 3-acetamido - 5 - (2,3-dihydroxypropoxy)2,4,6-triiodobenzoic acid. The acid, when placed in a melting point block at 67° C., began to shrink at 160° C., partly melted at 178–190° C., and then appeared to resolidify. A sample placed in the block at 178° C. melted at 179–180° C., with decomposition. N.E., 650 (theory, 647).

EXAMPLE 7

*Sodium salt of 3-acetamido-5-(2,3-dihydroxypropoxy)-2,4,6-triiodobenzoic acid*

3 - acetamido - 5 - (2,3 - dihydroxypropoxy) - 2,4,6 - triiodobenzoic acid was dissolved in a solution containing an equivalent amount of sodium hydroxide. The solution was then evaporated, yielding a residue of the sodium salt of 3 - acetamido - 5 - (2,3 - dihydroxypropoxy)-2,4,6-triiodobenzoic acid. The solubility of this salt is greater than 35 g./100 ml. of solution (greater than 42 g./100 ml. of water).

EXAMPLE 8

*N-methylglucamine salt of 3-acetamido-5-(2,3-dihydroxypropoxy)-2,4,6-triiodobenzoic acid*

3 - acetamido - 5 - (2,3 - dihydroxypropoxy) - 2,4,6 - triiodobenzoic acid (7.0 g.) was dissolved in a solution containing N-methylglucamine (2.1 g.) and sufficient water to make a final volume of 22.71 ml. Methyl p-hydroxybenzoate (0.025 g.) was added as a preservative. The resulting solution contained 40% (w./v.) of the N-methylglucamine salt of 3-acetamido-5-(2,3-dihydroxypropoxy)-2,4,6-triiodobenzoic acid.

The 40% solution described above was injected intravenously into male albino mice at various dosage levels up to a maximum of 14.7 g./kg. of body weight. At the end of the observation period of 48 hours, all of the animals treated were still living and exhibited normal appearance and behavior. The $LD_{50}$ of the compound is thus indicated to be greater than 14.7 g./kg.

EXAMPLE 9

*3-hydroxy-5-nitrobenzamide*

A mixture of methyl 3-hydroxy-5-nitrobenzoate (40 g., 0.203 mole) and concentrated ammonium hydroxide (100 ml.) was allowed to stand at room temperature for two days. The precipitate was filtered off and dissolved in hot methanol. The solution was treated with charcoal, filtered, concentrated and cooled to precipitate 3-hydroxy-5-nitrobenzamide. Yield, 25.5 g. (69%), M.P. 246–248° C., N.E., 178. (Theory, 182.)

EXAMPLE 10

*3-(2,3-dihydroxypropoxy)-5-nitrobenzamide*

Glycerol alpha-monochlorohydrin (7.0 g., 0.063 mole) in a little water was added dropwise to a solution of 3-hydroxy-5-nitrobenzamide (9.2 g., 0.05 mole), water (60 ml.), and sodium hydroxide (2.52 g., 0.063 mole). The solution was stirred and heated for 3 hours. On standing over the weekend the crude product separated, after which the mixture was stirred and heated for an additional 1½ hours. The neutral suspensional was cooled and filtered, and the cake was extracted twice with dilute sodium hydroxide at room temperature to remove starting material. The product was dissolved in water, treated with charcoal, and recrystallized. Yield of 3-(2,3-dihydroxypropoxy)-5-nitrobenzamide, 6 g. (46.3%), M.P., 152.2–153.2° C.

EXAMPLE 11

*3-amino-5-(2,3-dihydroxypropoxy)-benzamide*

A solution of 3-(2,3-dihydroxypropoxy)-5-nitrobenzamide (7.0 g., 0.0273 mole) in denatured alcohol (S.D. Formula 14 A, 150 ml.) was hydrogenated under pressure in the presence of a catalyst (2 g. of 10% palladium-on-charcoal). The theoretical quantity of hydrogen was absorbed in one-half hour. The catalyst was filtered off and the solution evaporated to dryness. Yield of 3-amino-5-(2,3-dihydroxypropoxy)-benzamide, 5.5 g. (89.1%), M.P. 162.3–164.8° C.

EXAMPLE 12

*3-amino-5-(2,3-dihydroxypropoxy)-2,4,6-triiodobenzamide*

Iodine monochloride (13 g., 0.075 mole, of 95% ICl in 13 ml. of 37% hydrochloric acid) was added to a dilute acid solution of 3-amino-5-(2,3-dihydroxypropoxy)-benzamide (5.5 g., 0.025 mole). After 2½ hours additional iodine monochloride (5 g.) was added. After an additional hour the excess iodine monochloride was reduced with sodium bisulfite, the slurry was cooled, and the 3-amino-5-(2,3-dihydroxypropoxy)-2,4,6-triiodobenzamide filtered off. Yield, 12 g. (80.2%).

EXAMPLE 13

*3-acetamido-5-(2,3-dihydroxypropoxy)-2,4,6-triiodobenzamide*

A mixture of 3-amino-5-(2,3-dihydroxypropoxy)-2,4,6-triiodobenzamide (5 g., 0.00827 mole), acetic anhydride (15 ml.) and sulfuric acid (1 ml.) was heated on the steam bath for ½ hour. The mixture was cooled and the solid filtered off. The cake was heated with ammonium hydroxide to hydrolyze any acetate ester, and the product was filtered off and washed with water. Yield of 3-acetamido-5-(2,3-dihydroxypropoxy)-2,4,6-triiodobenzamide, 5 g. (93.5%), M.P. 251.5–252.5° C. (dec.).

It will be understood that other 3-alkanamido-5-(dihydroxypropoxy)-benzoic acids, such as 3-propionamido-5-(2,3-dihydroxypropoxy)-2,4,6-triiodobenzoic acid, 3-butyramido - 5 - (2,3 - dihydroxypropoxy) - 2,4,6 - tri - iodobenzoic acid and 3-formamido-5-(2,3-dihydroxypropoxy)-2,4,6-triiodobenzoic acid, and other 3-alkanamido-5-(2,3-dihydroxypropoxy)-2,4,6-triiodobenzamides, such as 3-propionamido-5-(2,3-dihydroxypropoxy)-2,4,6-triiodobenzamide may be prepared by the methods illustrated in the foregoing examples. Also, it is to be understood that esters, such as the ethyl and propyl esters, and other customary non-toxic salts, such as the diethanolamine salts, of the 3-alkanamido-5-(dihydroxypropoxy-2,4,6-triiodobenzoic acids may be conveniently prepared and employed in accordance with the present invention.

In view of the above, it will be seen that the several objects of the invention are achieved and other advantageous results obtained.

As various changes could be made in the above products and processes without departing from the scope of the invention, it is intended that all matter contained in the above description shall be interpreted as illustrative and not in a limiting sense.

We claim:
1. A compound having the formula:

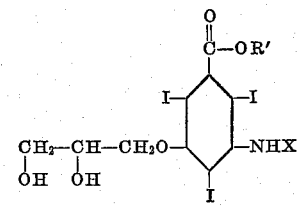

where X is selected from the group consisting of hydrogen and lower acyl radicals; and R' is selected from the group consisting of hydrogen, lower alkyl radicals and pharmaceutically acceptable cations.

2. 3-amino-5-(2,3-dihydroxypropoxy) - 2,4,6 - triiodobenzoic acid.

3. A 3-lower alkanamido-5-(2,3-dihydroxypropoxy)-2,4,6-triiodobenzoic acid and salts thereof with a pharmaceutically acceptable cation.

4. 3-acetamido-5-(2,3-dihydroxypropoxy) - 2,4,6 - triiodobenzoic acid.

5. The sodium salt of 3-acetamido-5-(2,3-dihydroxypropoxy)-2,4,6-triiodobenzoic acid.

6. The N-methylglucamine salt of 3-acetamido-5-(2,3-dihydroxypropoxy)-2,4,6-triiodobenzoic acid.

7. The process of preparing a 3-alkanamido-5-(2,3-dihydroxypropoxy)-2,4,6-triiodobenzoic acid which comprises reacting a salt of an ester of 5-hydroxy-3-nitrobenzoic acid with a glycerol monohalohydrin to form an ester of 5-(2,3-dihydroxypropoxy)-3-nitrobenzoic acid, hydrolyzing said ester to form 5-(2,3-dihydroxypropoxy)-3-nitrobenzoic acid, reducing the 5-(2,3-dihydroxypropoxy)-3-nitrobenzoic acid to 3-amino-5-(2,3-dihydroxypropoxy)-benzoic acid, reacting the 3-amino-5-(2,3-dihydroxypropoxy)-benzoic acid with an iodinating agent to form 3-amino-5-(2,3-dihydroxypropoxy)-2,4,6-triiodobenzoic acid and thereafter reacting the 3-amino-5-(2,3-dihydroxypropoxy)-2,4,6-triiodobenzoic acid with an acylating agent to form a 3-alkanamido-5-(2,3-dihydroxypropoxy)-2,4,6-triiodobenzoic acid.

8. The process of preparing a 3-alkanamido-5-(2,3-dihydroxypropoxy) - 2,4,6 - triiodobenzamide which comprises reacting a salt of an ester of 5-hydroxy-3-nitrobenzoic acid with ammonia to form 5-hydroxy-3-nitrobenzamide, reacting said 5-hydroxy-3-nitrobenzamide under alkaline conditions with a glycerol monohalohydrin to form 5-(2,3-dihydroxypropoxy)-3-nitrobenzamide acid, reducing the 5-(2,3-dihydroxypropoxy)-3-nitrobenzamide to 3-amino-5-(2,3-dihydroxypropoxy)-benzamide, treating the 3-amino-5-(2,3-dihydroxypropoxy)-benzamide with an iodinating agent to form 3-amino-5-(2,3-dihydroxypropoxy)-2,4,6-triiodobenzamide, and thereafter reacting the 3-amino-5-(2,3-dihydroxypropoxy)-2,4,6-triiodobenzamide with an acylating agent to form a 3-alkanamido-5-(2,3-dihydroxypropoxy)-2,4,6-triiodobenzamide.

References Cited in the file of this patent

UNITED STATES PATENTS

| | | |
|---|---|---|
| 2,611,786 | Wallingford | Sept. 23, 1952 |
| 2,776,241 | Priewe et al. | Jan. 1, 1957 |
| 2,820,814 | Ginsberg | Jan. 21, 1958 |

FOREIGN PATENTS

| | | |
|---|---|---|
| 517,382 | Great Britain | Jan. 29, 1940 |
| 605,737 | Great Britain | July 29, 1948 |

UNITED STATES PATENT OFFICE
CERTIFICATION OF CORRECTION

Patent No. 2,963,474                      December 6, 1960

Philip E. Wiegert et al.

It is hereby certified that error appears in the above numbered patent requiring correction and that the said Letters Patent should read as corrected below.

Column 4, line 37, for "22.71 ml." read -- 22.7 ml. --; line 71, for "suspensional" read -- suspension --; column 5, line 8, for "Formula 14 A" read -- Formula 13 A --; line 56, for "poxy-2,4,6-" read -- poxy)-2,4,6- --.

Signed and sealed this 9th day of May 1961.

(SEAL)
Attest:

ERNEST W. SWIDER
Attesting Officer

DAVID L. LADD
Commissioner of Patents